United States Patent
Hirayama et al.

(10) Patent No.: US 6,741,260 B2
(45) Date of Patent: May 25, 2004

(54) METHOD FOR COLOR MATCHING OF BRIGHT PAINT

(75) Inventors: Tohru Hirayama, Chigasaki (JP); Shinichi Gamou, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 53 days.

(21) Appl. No.: 10/070,463

(22) PCT Filed: Jun. 26, 2001

(86) PCT No.: PCT/JP01/05463

§ 371 (c)(1),
(2), (4) Date: Mar. 7, 2002

(87) PCT Pub. No.: WO02/04567

PCT Pub. Date: Jan. 17, 2002

(65) Prior Publication Data

US 2003/0067475 A1 Apr. 10, 2003

(30) Foreign Application Priority Data

Jul. 7, 2000 (JP) ............................ 2000-205984

(51) Int. Cl.$^7$ ............................................... G09G 5/02
(52) U.S. Cl. ........................ 345/589; 345/593; 345/597; 345/591; 345/604
(58) Field of Search ................................. 345/589, 593, 345/597, 591, 604

(56) References Cited

U.S. PATENT DOCUMENTS

| | | |
|---|---|---|
| 3,601,589 A | 8/1971 | McCarty |
| 4,813,000 A | 3/1989 | Wyman et al. |
| 5,224,421 A * | 7/1993 | Doherty .................... 101/211 |
| 5,590,251 A | 12/1996 | Takagi |
| 5,929,998 A | 7/1999 | Kettler et al. |
| 2001/0036309 A1 | 11/2001 | Hirayama et al. |

FOREIGN PATENT DOCUMENTS

| | | |
|---|---|---|
| JP | 63-153677 | 6/1988 |
| JP | 6-279716 A | 10/1994 |
| JP | 6-279716 | 10/1994 |
| JP | 10-310727 A | 11/1998 |
| JP | 10/310727 | 11/1998 |
| JP | 11-228880 A | 8/1999 |
| JP | 11-228880 | 8/1999 |
| JP | 11-269411 | 10/1999 |
| JP | 11-286635 A | 10/1999 |
| JP | 11-286635 | 10/1999 |
| JP | 2001-221690 | 8/2001 |

\* cited by examiner

*Primary Examiner*—Matthew C. Bella
*Assistant Examiner*—Tam Tran
(74) *Attorney, Agent, or Firm*—Wenderoth, Lind & Ponack, L.L.P.

(57) ABSTRACT

The following steps (1) to (3) are executed by using a computer toning apparatus constituted by (A) a calorimeter, (B) micro-brilliant-feeling sample-color tags, and (C) a computer in which a plurality of paint blendings, color data and micro-brilliant-feeling data corresponding to the paint blendings, and color characteristic data and micro-brilliant-feeling characteristic data of a plurality of primary-color paints are entered and a color-matching logic works: (1) a step of measuring a reference color with which a paint color should be matched by a colorimeter and obtaining the color data of the reference color, (2) a step of comparing the reference color with the micro-brilliant-feeling sample-color tags and deciding the micro-brilliant-feeling of the reference color, and (3) a step of comparing the color data and micro-brilliant feeling of the reference color with the color data and micro-brilliant feeling data corresponding to the paint blendings previously entered in the computer, and selecting a prospective paint blending.

8 Claims, 1 Drawing Sheet

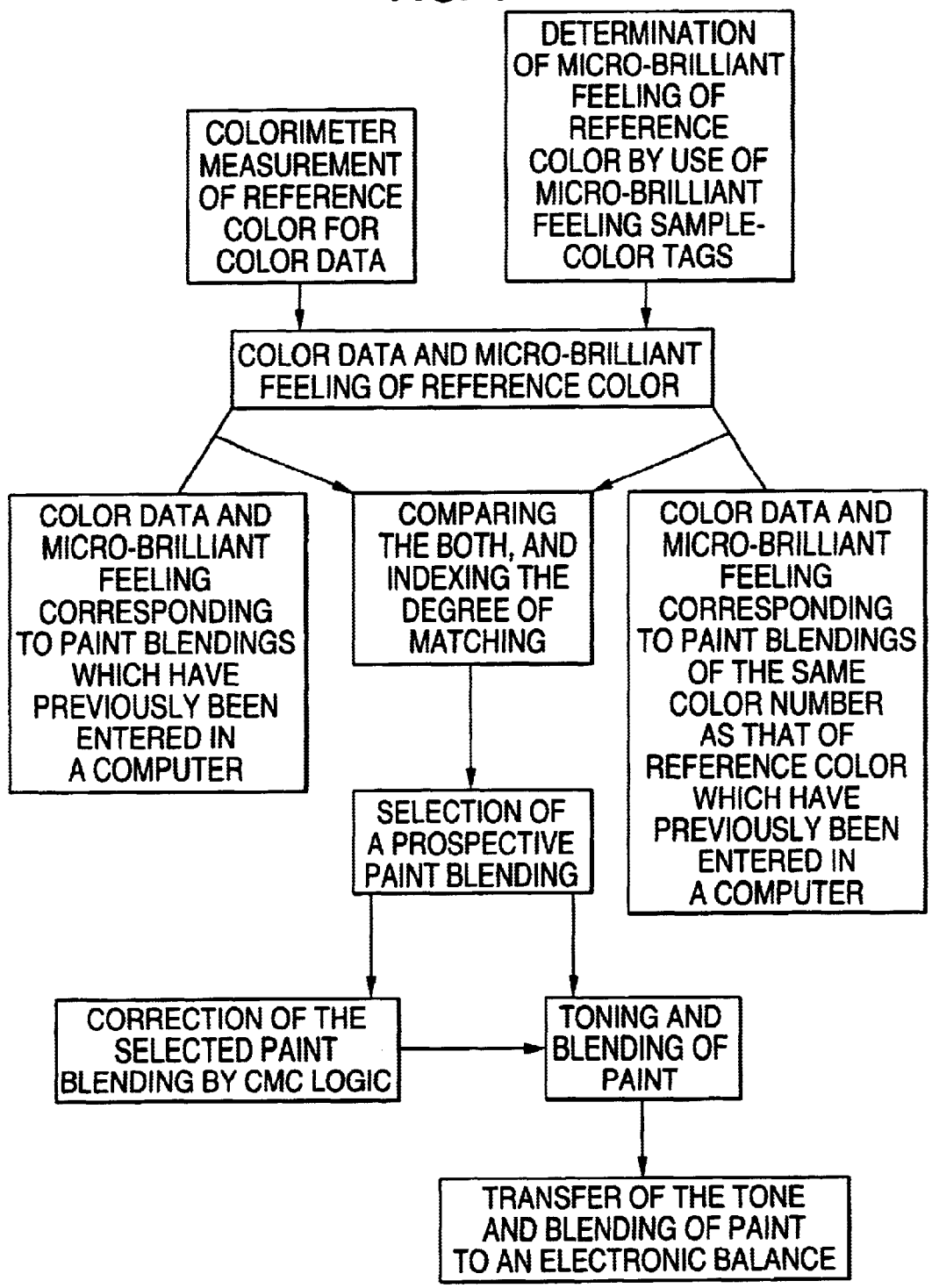

METHOD FOR COLOR MATCHING OF BRIGHT PAINT

TECHNICAL FIELD

The present invention relates to a computer toning apparatus and a toning method of a paint having brilliant feeling using micro brilliant-feeling sample-color tags.

BACKGROUND ART

A color matching system using a computer is publicly known as described in the specification of U.S. Pat. No. 3,601,589. The above U.S. Patent discloses a method in which all spectral reflectances of an unknown color panel are decided by a scanning spectrophotometer and sent to a computer, and the computer mathematically processes previously stored data showing K-value (indicating "light absorption factor") and S-value (indicating "light scattering factor") to perform logical color matching.

The disclosed contents of the above U.S. Patent basically relate to a series of computing procedures. That is, according to the computing procedures, it is possible to compute K-value and S-value for each of spectral wavelengths and moreover decide K- and S-values of a combination of a pair of pigments so that the values become equal to K- and S-values of an unknown color for each of the above spectral wavelengths. This is a basic color-matching algorithm used for other spectral-light-intensity-based color matching systems.

The system according to the above U.S. Patent has the following two problems: the first problem is that the system is very expensive and the maintenance of the system is difficult and the second problem is that logical color matching is performed by using the data of an unknown color obtained for a known pigment. That is, a color finally obtained by mixing pigments in accordance with a color value obtained by computation may become a color different from the above unknown color. Therefore, because the above color-matching formula is a primary mathematical approximation method, it is normally necessary to correct and adjust the system.

To improve the system, the official gazette of Japanese Patent Laid-Open No. 153677/1989 discloses a method and an apparatus of analyzing a selected color by a portable color meter, storing the color data showing the hue, chroma, and lightness of the selected color, connecting the color data in the color meter to a computer, storing a plurality of usable color formulas (paint blending) in the computer, storing the data showing hues, chromas, and lightnesses of paints designated by the stored usable color formulas in the computer, finding the most approximate matching by comparing the data of the selected color received from the color meter with the stored color data showing the stored usable color formulas, selecting a stored color formula shown by the color data found as the most approximate matching, and thereby performing color matching for the selected color.

Moreover, as paint colors of automobiles, the number of paint colors having brilliant feeling is recently increased in which aluminum powder or brilliant mica is blended from the viewpoints of diversification of personal tastes and improvement of beauty. When performing color matching to repair-paint the paint colors having brilliant feeling, the color-matching accuracy of the color-matching method disclosed in the official gazette of Japanese Patent Laid-Open No. 153677/1988 is not sufficient yet and a color-matching method for paint colors having brilliant feeling by a computer has not been proposed so far. Moreover, there is a problem that toning of a paint color having brilliant feeling is difficult for an immature toning person.

Furthermore, because a marketed calorimeter cannot perform measurement separate from brilliant feeling, micro brilliant feeling e.g. graininess of aluminum) may not be frequently adjusted though a color is toned.

It is an object of the present invention to provide a computer toning method capable of accurately toning a paint color having brilliant feeling and allowing an immature toning person to easily perform toning.

BRIEF SUMMARY OF THE INVENTION

The present inventor found that the above object can be achieved by using a computer toning apparatus constituted by a calorimeter, micro brilliant-feeling sample-color tags, and a computer to which various paint blendings and paint-color data values are input and in which a color-matching computation logic works and finished the present invention.

That is, the present invention provides a toning method of a paint having brilliant feeling (hereafter may be referred to as a first toning method), characterized by executing the following steps (1) to (3) by a computer toning apparatus constituted by (A) a calorimeter, (B) micro brilliant-feeling sample-color tags, and (C) a computer in which a plurality of paint blendings, color data and micro brilliant-feeling data, and color characteristic data of a plurality of primary colors and micro brilliant-feeling characteristic data are entered and a color-matching computation logic using the paint blendings and the data values works. That is, the present invention comprises:

(1) a step of measuring a reference color to which a paint color should be adjusted through toning by a colorimeter and obtaining the data of the reference color;

(2) a step of comparing the reference color with micro brilliant-feeling sample-color tags and deciding the micro brilliant feeling of the reference color; and (3) a step of comparing the color data and micro brilliant feeling of the reference color with the color data and micro brilliant-feeling data corresponding to paint blendings previously entered in a computer, indexing matching degrees between colors and micro brilliant feelings of the entered paint blendings, and selecting a prospective paint blending.

Moreover, the present invention provides the above toning method characterized by executing (4) a step of correcting the selected prospective paint blending by using a color-matching computation logic and obtaining a corrected blending closer to a reference color after the above step (3).

Furthermore, the present invention provides the above toning method characterized by transferring the prospective corrective paint blending obtained in the step (3) or the corrected blending obtained in the step (4) to an electronic balance.

Furthermore, the present invention provides a toning method of a paint having brilliant feeling (hereafter may be referred to as second toning method) characterized by executing the following steps (5) to (7) by a computer toning apparatus constituted by (A) a colorimeter, (B) micro brilliant-feeling sample-color tags, and (C) a computer in which a plurality of color numbers, paint blendings correspond to the color numbers, color data and micro brilliant-feeling data corresponding to the paint blendings, and color characteristic data and micro brilliant-feeling data of a plurality of primary-color paints are entered and a color-matching computation logic using the paint blendings and the data values works. That is, the present invention comprises:

(5) a step of measuring a reference color to which the color of a paint should be adjusted by a colorimeter through toning and obtaining the data of the reference color;

(6) a step of comparing the reference color with micro brilliant-feeling sample-color tags and deciding the micro brilliant feeling of the reference color; and (7) a step of selecting the color data and micro brilliant-feeling data of at least one paint blending having the color number same as the preset color number of the reference color, comparing the color data and micro brilliant-feeling data of the selected paint blending with the color data and micro brilliant feeling of the reference color, indexing the matching degree between the color and the micro brilliant feeling of the selected paint blending, and selecting a prospective paint blending.

Furthermore, the present invention provides the above toning method characterized by executing (8) a step of correcting the selected prospective paint blending by a color-matching logic and obtaining a corrected blending closer to a reference color after the above step (7).

Furthermore, the present invention further provides the above toning method characterized by transferring the prospective paint blending obtained in step (7) or the corrected blending obtained in step (8) to an electronic balance.

BRIEF DESCRIPTION OF THE DRAWING

FIG. 1 depicts a flow sheet of the method according to the present invention

Best Mode for Carrying Out the Invention

A toning method of the present invention is described below in detail and is depicted by the flow sheet of FIG. 1.

A toning method of the present invention is a method for toning a paint having brilliant feeling capable of forming a brilliant paint film by using a colorimeter (A), micro brilliant-feeling sample-color tags, and a computer (C) in which a color-matching logic works to be described later.

The above paint having brilliant feeling can use any one of paints containing brilliant pigments having brilliant feeling and interference action such as flaky aluminum powder, vapor-deposition aluminum powder, colored aluminum powder, mica-like iron oxide, mica powder, metal-oxide-covered mica powder, metal-oxide-covered silica flake, and brilliant graphite, brilliant-material powder such as metallic powder such as copper powder, and coloring pigment according to necessity.

Colorimeter (A)

A colorimeter (A) is a unit for obtaining the color data of a paint film by measuring the color of the paint film and it is possible to use any known calorimeter as long as it can achieve the above object.

It is preferable to use a multi-angle calorimeter capable of measuring many angles as a colorimeter. In the case of the multi-angle calorimeter, measurement is performed under two or more conditions in which two or more angle conditions, usually two to four angle conditions, that is, incident angles of the light to be measured are different from each other or two or more conditions in which right-receiving angles formed between a mirror-surface reflection axis and a light-receiving axis are different from each other. The mirror-surface reflection axis is an axis for forming a reflection angle when an incident angle and the reflection angle are equal to each other, that is, an axis in which the reflection angle is 45° when the incident angle is 45°.

To change light-receiving angles, the angle condition is not restricted. In general, however, the following cases are preferable because it is easy to correspond to determination of a color according to visual observation: when there are two angle conditions, these two conditions are applied to ranges of the light-receiving angle between 15° and 30° and between 75° and 110° one each; when there are three angle conditions, these conditions are applied to ranges of the light-receiving angle between 15° and 30°, between 35° and 60°, and between 75° and 110° one each; and when there are four angle conditions, these conditions are applied to ranges of the light-receiving angle between 15° and 30°, between 35° and 60°, between 70° and 80°, and between 90° and 110° one each.

Each measured value (angular reference measured value) obtained by measuring the color of the above paint film in accordance with each angle condition can use any value as long as the value can specify a color by expressing or computing the lightness, chroma, and hue. For example, it is possible to express the lightness, chroma, and hue by an XYZ color specification system (X, Y, and Z), L*a*b* color specification system (L*, a*, and b* values), Hunter's color specification system (L, a, and b values), L*C*h color specification system (L* value, C* value, and h value) specified in CIE (1994), or Munsell color specification system. Particularly, indication by the L*a*b* color specification system or L*C*h color specification system is generally used for indication of a color in industrial fields including the automobile repair-painting field.

Micro-brilliant-feeling sample-color Tags (B)

Micro brilliant feeling denotes the texture of the peculiar brilliance revealed in a paint color containing a brilliant pigment such as aluminum powder or brilliant mica powder. For example, the micro brilliant feeling corresponds to the graininess, glittering or dazzling feeling, or rough texture of aluminum or mica, or size of particles. The micro-brilliant-feeling sample-color tags (B) are used to compare a purposed paint color with the micro brilliant feeling of a reference color to be matched, select color tags having similar micro brilliant feeling, and decide the micro brilliant feeling of a purposed paint film out of the color tags. For example, the tags (B) can be systematically-arranged color tags prepared by applying brilliant-material-contained paints obtained by changing qualities, particle diameters, and blending quantities of brilliant materials and thereby blending the materials to a substrate and drying the paints.

Specific examples of the micro-brilliant-feeling sample-color tags (B) include a booklet and a card in which paint colors of domestic and foreign automobiles are printed for each year and each automobile maker in the field of repair painting of automobiles.

Micro-brilliant-feeling data values, color numbers, or color names are described in the micro-brilliant-feeling sample-color tags (B) and it is necessary that micro-brilliant-feeling data can be extracted from these color numbers or color names.

Though various types of data values are considered as the micro-brilliant-feeling data values, the present inventor et al. find that micro-brilliant feelings are well matched when two parameters "MGR" and "MBV" well coincide with each other and describe a toning method of a paint using these micro-brilliant-feeling parameters in the specification of Japanese Patent Application No. 28414/2000. "MGR" is a parameter expressing the particle feeling {perception generated by irregular non-directional patterns (random patterns) caused by orientation and overlap of brilliant pigments in paint film} and "MBV" is a parameter obtained by digitizing the glittering feeling (perception of irregular fine brilliancy caused by light regularly reflected from brilliant pigment in paint film).

"MGR" and "MBV" can be respectively obtained from a two-dimensional image formed by photographing the surface of a brilliant paint film irradiated with light by a CCD camera.

"MGR" is computed in accordance with a two-dimensional power-spectrum integrated value (hereafter may be abbreviated as "IPSL") shown by the following expression obtained by integrating the power of a low spatial frequency component in accordance with a spatial frequency spectrum obtained by applying two-dimensional Fourier transform to the above two-dimensional image and normalizing the integrated power by a DC component.

Numerical Formula 1

Two-dimensional power-spectrum integrated value=

$$\frac{\int_0^L \int_0^{2\pi} P(v, \theta) dv d\theta}{P(0, 0)}$$

(In the above expression, v denotes a spatial frequency, θ denotes an angle, P denotes a power spectrum, 0 to L denote extracted low-spatial-frequency areas, and L denotes the upper limit of an extracted frequency.)

It is also possible to evaluate "particle feeling" in accordance with the value of MGR computed by the following linear expression in accordance with the above two-dimensional power-spectrum integrated value (IPSL).

When the value of IPSL is 0.32 or more, the following expression is effectuated.

$$MGR=[(IPSL \times 1000)-285]/2$$

When the value of IPSL ranges between 0.15 and 0.32 (both excluded), the following expression is effectuated.

$$MGR=[IPSL \times (35/0.17)-(525/17)]/2$$

When the value of IPSL is 0.15 or less, the following expression is effectuated.

$$MGR=0$$

Each of the above values of MGR is a value set to 0 when a brilliant material does not have particle feeling or a value set to approx. 100 when the brilliant material has highest particle feeling. Thus, a material having higher "particle feeling" shows a larger value.

"MBV" is a value computed in accordance with the data obtained by analyzing a two-dimensional image formed by photographing it by a CCD camera by an image analyzer, which is obtained as described below.

That is, a two-dimensional image is divided into a lot of blocks, brightnesses of all the blocks are totalized to obtain a totalized value and an average brightness x is obtained by dividing the totalized value by all blocks to set a threshold value α to a value equal to or higher than the average brightness x. It is generally proper that the threshold value a is the sum of average brightnesses x and y (y is a value ranging between 24 and 40, preferably ranging between 28 and 36, more preferably equal to 32).

Then, the threshold value a is subtracted from each of the brightnesses of the blocks and positive subtracted values are totalized to obtain the total volume V that is the sum of the subtracted values. Moreover, the total area S is obtained which is the total number of blocks having a brightness equal to or larger than the threshold value α (total number of blocks having brightness equal to or higher than the above threshold value α obtained by converting them into binary values in accordance with the threshold value α). The average height PHavα of brightness peaks is assumed as a value obtained by multiplying the value obtained by dividing the total volume V by the total area S by 3, that is, a value obtained from the following expression because it is considered that a brightness peak can be approximated to a cone or pyramid.

$$PHav\alpha = 3V/S$$

Moreover, a threshold value β is set which ranges between the above average brightness x and the above threshold value α (both included). It is proper that the threshold value β is equal to or less than the threshold value α and generally the sum of average brightnesses x and z (z is a value ranging between 16 and 32, preferably ranging between 20 and 28, more preferably equal to 4).

Then, the threshold value β is subtracted from the brightness of each of the above blocks and positive subtracted values are totalized to obtain the total volume W which is the sum of the subtracted values. Moreover, the total area A is obtained which is the total number of blocks having brightness equal to or higher than the threshold value β (total number of block having brightness equal to or higher than the threshold value β obtained by converting them into binary values in accordance with the threshold value β). It is possible to assume the average height Phav β of brightness peaks at the threshold value β as a value obtained by multiplying the value obtained by dividing the total volume W by the total area A by 3, that is, a value obtained from the following expression because it is considered that a brightness peak can be approximated to a cone or pyramid.

$$Phav\beta = 3W/A$$

Moreover, it is possible to obtain the average particle area of optical particles from the total area A at the threshold value β and the number of optical particles C showing the brightness equal to or higher than the threshold value β. In the present invention, an "optical particle" denotes an "independent continuum having a brightness equal to or higher than a threshold value on a two-dimensional image". The shape of the above optical particle is assumed as a circle and the diameter D of a circle having an area equal to the average particle area is obtained from the following expression.

Numerical Formula 2

$$D=\sqrt{(4A/\pi C)}$$

Then, the peak skirt of average PSav of brightness peaks is obtained from the following expression in accordance with the above phavβ and D.

$$PSav = D/PHav\beta$$

It is possible to approximately compute a brightness value BV by the following expression in accordance with the brightness-peak average height Phavα and brightness-peak skirt of average PSav obtained as described above.

$$BV = PHav\alpha + a \cdot PSav$$

(In the above expression, "a" is equal to 300 when Phavα is less than 25 but "a" is equal to 1,050 when PHavα exceeds 45 and is equal to a value shown by the following expression when PHavα ranges between 25 and 45.)

$$a = 300 + 37.5 \times (PHav\alpha - 25)$$

The value of MBV can be obtained by computing it by the following linear expression in accordance with the above brightness value BV.

$$MBV=(BV-50)/2$$

The value of M BV is set to 0 for no glittering feeling and set to approx. 100 for highest-glittering feeling and increases for higher "glittering feeling".

Computer (C) in which Color-matching-computation Logic Works

A plurality of paint blendings, color data and micro-brilliant-feeling data corresponding to the paint blendings, color characteristic data and micro-brilliant-feeling characteristic data of a plurality of primary-color paints, and according to necessity, a plurality of color numbers and a plurality of paint blendings corresponding to the color numbers are entered in the computer (C) in which color-matching computation logics using the paint blendings and the data work. Moreover, it is allowed to enter micro-brilliant-feeling data values of color numbers or color names in the computer (C) according to necessity so that micro-brilliant-feeling data corresponding to a color number or color name can be fetched.

It is possible that the color data corresponding to each paint blending entered in the computer is the colorimetric data of a paint film obtained from each paint measured by a multi-angle colorimeter.

The color characteristic data values of primary-color paints entered in the computer can be K-value (light absorption coefficient) and S-value (light scattering coefficient) of primary-color paints. The above K-value and S-value can be obtained by digitizing the colorimetric data of a primary-color paint and a diluted color of the primary-color paint.

The above color numbers entered in the computer according to necessity are usually color code numbers designated for each painted-product manufacturing maker and paint blendings for repair painting are entered in accordance with the color numbers. In the case of the paint blendings, one paint blending can correspond to one color number. However, actual blendings can be included and it is allowed to enter a plurality of paint blendings. Moreover, the colorimetric data of formed paint films measured by a multi-angle colorimeter are previously entered in the computer.

A computer toning method of the present invention includes two modes such as a first toning method which does not have a step of selecting a paint blending out of the same color numbers by using a color number and a second toning method which has a step of selecting a paint blending out of the same color numbers by using a color number.

First, the first toning method is described in accordance with steps in order.

Step (1):

Step (1) is a step of measuring the paint film of a reference color with which the color of a paint should be matched through toning by the above calorimeter (A) and obtaining the color data of the reference color.

It is preferable to obtain color data under the above angle conditions by measuring the reference color which is the color of a paint film with which a paint color should be matched by the multi-angle calorimeter. When forming a repair paint film in repair painting such as automobile repair paining, it is necessary that the difference between the color of the paint film of a repair-painting portion and the color of a paint film nearby the repair-painting portion is not easily visually recognized. Therefore, it is normally suitable that the above reference color is the color of the paint film nearby the repair-painting portion.

Step (2)

Step (2) is a step of comparing the above reference color with the above micro-brilliant-feeling sample-color tags (B) and deciding the micro-brilliant-feeling data of the reference color. Usually, a color tag probably nearest to the micro-brilliant feeling of the reference color is selected out of the micro-brilliant sample-color tags (B) to decide the micro-brilliant-feeling data in accordance with the selected color tag. It is also allowed to record micro-brilliant-feeling data and the bending ratio of brilliant materials in each color tag or it is allowed to separately obtain micro-brilliant-feeling data and the blending ratio of brilliant materials from the color number or color name of the paint color on each color tag.

Step (3)

In step (3), a prospective paint blending is selected by comparing the color data of the reference color obtained in the above step (1) and the micro-brilliant feeling of the reference color obtained in the above step (2) with the color data and micro-brilliant-feeling data corresponding to paint blendings previously entered in a computer and indexing the matching degree between the color and the micro-brilliant feeling of the entered paint blending. It is possible to properly select a prospective paint blending which may be the most rational by considering the matching degree of the color and micro-brilliant feeling with a reference color and the blending data. The above selection method is not restricted. It is preferable to select a prospective paint blending out of blendings in which the matching degree of the color difference and micro-brilliant feeling with a reference color is kept in a certain range.

Though the first toning method uses the above steps (1), (2), and (3) as indispensable steps, it is also allowed to execute the following step (4) after step (3) in order to make a color further approach to a reference color.

Step (4)

Step (4) is a step of obtaining a corrected blending made to further approach to a reference color by using a computer in which a plurality of paint blendings, color data and micro-brilliant-feeling data corresponding to each of the paint blendings, and color characteristic data and micro-brilliant-feeling characteristic data of a plurality of primary-color paints are entered and thereby correcting the prospective paint blending selected in step (3) by a color-matching-computation logic using the above paint blendings and data.

It is also allowed that the first toning method further includes a step of transferring the prospective paint blending obtained in the above step (3) or the corrected blending obtained in step (4) to an electronic balance.

Then, the second toning method is described below.

In the case of the second toning method, the following steps (5) to (7) are executed by further using a plurality of entered color numbers and paint blendings corresponding to the color numbers as the data entered in the computer used for the above first toning method.

Step (5)

Step (5) is a step same as step (1) for the first toning method.

Step (6)

Step (6) is a step same as step (2) for the first toning method.

Step (7)

In step (7), a prospective paint blending is selected by selecting the color data and micro-brilliant-feeling data of at least one paint blending having a color number same as the color number of a reference color out of color numbers previously entered in a computer, comparing the color data and micro-brilliant-feeling data of the selected paint blending with the color data and micro-brilliant feeling of the reference color, and indexing the matching degree of the color and micro-brilliant feeling of the selected paint blending. It is possible to properly select a prospective paint blending which may be the most rational by considering the matching degree of a reference color and micro-brilliant feeling with a reference color and blending data.

Though the second toning method uses the above steps (5), (6), and (7) as indispensable steps, it is allowed to execute the following step (8) after step (7) in order to make a color further approach to a reference color.

Step (8)

Step (8) is a step same as step (4) for the first toning method and a step of correcting the prospective paint blending selected in step (7) and obtaining a corrected blending made to further approach to a reference color.

It is allowed that the second toning method further includes a step of transferring the prospective paint blending obtained in the above step (7) or the corrected blending obtained in step (8) to an electronic balance.

In the case of the above first and second toning methods, it is possible to transfer a blending to an electronic balance through a telephone line or an optical cable. It is possible to blend toning paints in accordance with the transferred blending by using an electronic balance. By preparing a toned-paint plate coated with the toning paint, it is possible to determine whether the paint is acceptable. If it is not acceptable, it is possible to obtain a corrected blending again by operating a color-matching-computation logic in accordance with the bending of the toning paint and the color data and micro-brilliant-feeling data of the toned-paint plate.

EMBODIMENT

The present invention is further specifically described below by referring to embodiments. However, the present invention is not restricted to the embodiments.

Apparatus Used and Measuring Method

In the case of the following embodiments, a reference color with which the color of a paint should be matched through toning is measured by a multi-angle colorimeter "Van-VanFA Sensor" made by KANSAI PAINT CO., LTD. and a computer in which color characteristic data and micro-brilliant-feeling characteristic data of a plurality of primary color paints are entered and a color-matching-computation logic using blendings of the paints and the data values works uses the computer color-matching system "Van-VanFA Station" made by KANSAI PAINT CO., LTD. The above "Van-VanFA Sensor" can obtain a color-measured value by measuring data under three-angle conditions in which angles formed between a mirror-surface reflection axis and a light-receiving axis are 25°, 45°, and 75°.

Micro-brilliant-feeling sample-color tags use the "Auto Color" made by KANSAI PAINT CO., LTD. The "Auto Color" is a booklet in which paint colors of domestic and foreign automobiles are printed for each year and each automobile maker to compare micro-brilliant feelings between a reference color and a same-color-based paint color printed in the "Auto Color" and select a paint color closest to the reference color. The micro-brilliant-feeling measured value of the selected paint color is stored in the database of the "Van-VanFA Station".

Embodiment

Reference colors of the paint film surface of automobiles include three colors such as high-lightness silver metallic (silver M1), middle-lightness green metallic pearl (green MP), and low-lightness blue pearl (blue P).

Color measured values of the above three reference colors under three angle conditions are shown below.

TABLE 1

| Color | Light-receiving Angle | L* | a* | b* |
|---|---|---|---|---|
| Silver M1 | 250 | 99.96 | −1.48 | −0.65 |
| | 45° | 65.34 | −0.96 | −2.17 |
| | 75° | 42.02 | −0.78 | −2.38 |
| Green MP | 25° | 52.28 | −48.18 | −10.80 |
| | 45° | 30.39 | −32.89 | −11.31 |
| | 75° | 15.97 | −22.03 | −10.87 |
| Blue P | 25° | 15.23 | −1.57 | −9.57 |
| | 45° | 3.21 | 0.32 | −3.68 |
| | 75° | 1.10 | 0.58 | −1.08 |

Moreover, the following are micro-brilliant-feeling data values (MGR and MBV) of most approximate paint colors selected out of Auto Color. In Table 2, MGR is a parameter obtained by digitizing particle feeling and MBV is a parameter obtained by digitizing glittering feeling.

TABLE 2

| Color | MGR | MBV |
|---|---|---|
| Approximate color of silver M1 | 62.89 | 47.38 |
| Approximate color of green MP | 56.50 | 40.50 |
| Approximate color of blue P | 59.82 | 40.20 |

The following are quantities of primary-color paints (paint blendings) computed by the computer color-matching system in accordance with micro-brilliant-feeling data values of most-approximate paint colors selected out of measured values under three angle conditions of the above three reference colors and Auto Color.

| Type of primary-color paint | Weight ratio |
|---|---|
| Silver M1 | |
| Silver A (Metallic primary color A) | 41.1 |
| Silver B (Metallic primary color B) | 35.3 |
| Black A (Black primary color A) | 0.9 |
| Blue A (Blue primary color A) | 0.4 |
| Assistant A (Aluminum orientation regulator A) | 18.8 |
| Assistant B (Aluminum orientation regulator B) | 3.5 |
| Green MP | |
| Blue A (Blue primary color A) | 42.0 |
| Green A (Green primary color A) | 24.0 |
| Silver C (Metallic primary color C) | 15.5 |
| Blue B (Blue primary color B) | 5.0 |
| Pearl A (Pearl primary color A) | 2.1 |
| Maroon A (Reddish-brown primary color A) | 1.3 |
| Assistant A (Aluminum orientation regulator A) | 8.4 |
| Assistant B (Aluminum orientation regulator B) | 1.7 |
| Blue P | |
| Black B (Black primary color B) | 39.2 |
| Blue C (Blue primary color C) | 22.3 |
| Blue D (Blue primary color D) | 19.1 |
| Pearl B (Pearl primary color B) | 10.5 |
| Pearl C (Pearl primary color C) | 8.9 |

Toned-paint plates are prepared in accordance with the above paint blendings. The following able shows measured values of reference colors and colors of the above toned-paint plates in the L* a* b* color system when performing three-angle-condition measurement by the above multi-angle calorimeter.

TABLE 3

| Color | Light-receiving Angle | ΔL* | Δa* | Δb* | ΔE* |
|---|---|---|---|---|---|
| Silver M1 | 25° | 3.86 | 0.08 | 1.03 | 4.00 |
| | 45° | 1.78 | 0.09 | 0.96 | 2.02 |
| | 75° | 0.60 | −0.03 | 1.23 | 1.37 |
| Green MP | 25° | 2.01 | 0.48 | −2.77 | 3.46 |
| | 45° | 1.40 | 0.77 | −2.23 | 2.75 |
| | 75° | 0.68 | 1.08 | −1.51 | 1.98 |
| Blue P | 25° | 3.56 | −0.36 | −1.16 | 3.77 |
| | 45° | 1.90 | −0.25 | −1.94 | 2.73 |
| | 75° | 0.68 | −0.06 | −0.59 | 0.90 |

The micro-brilliant feelings of the toned-paint plates and reference colors are well matched each other. However, color differences between measured values of paint colors of the toned-paint plates and measured values of reference colors are large and moreover, differences are detected in visual determination. Therefore, quantities of primary-color paints (additional designated quantities) required to correct colors of paints to be toned in accordance with color measured values at various angles on the toned-paint plates are computed by the computer color-matching system. Moreover, the following are the then additional designated quantities to 100 parts by weight of the above toned paints.

| Type of primary-color paint | Part by weight |
|---|---|
| Silver M1 | |
| Black A (Black primary color A) | 3.9 |
| Assistant A (Aluminum orientation regulator A) | 0.9 |
| Assistant B (Aluminum orientation regulator B) | 0.2 |
| Green MP | |
| Green A (Green primary color A) | 7.5 |
| Assistant A (Aluminum orientation regulator A) | 0.5 |
| Assistant B (Aluminum orientation regulator B) | 0.9 |
| Yellow A (Yellow primary color A) | 1.3 |
| Blue P | |
| Black B (Black primary color B) | 17.2 |
| Blue C (Blue primary color C) | 7.5 |

The following Table 4 shows values of ΔL*, Δa*, Δb*, and ΔE* from reference colors when measuring toned-paint plates obtained by painting the plates with paints corrected by the above additional designated quantities by a multi-angle colorimeter at various angle conditions.

TABLE 4

| Color | Light-receiving angle | ΔL* | Δa* | Δb* | ΔE* |
|---|---|---|---|---|---|
| Silver M1 | 25° | 0.92 | −0.01 | −0.12 | 0.93 |
| | 45° | 0.29 | −0.01 | −0.07 | 0.30 |
| | 75° | −0.30 | −0.08 | −0.16 | 0.34 |
| Green MP | 25° | −0.07 | 0.61 | 0.54 | 0.82 |
| | 45° | −0.15 | 0.07 | 0.42 | 0.45 |
| | 75° | −0.04 | −0.26 | 0.29 | 0.39 |
| Blue P | 25° | −1.36 | 0.31 | 0.72 | 1.57 |
| | 45° | −0.57 | 0.12 | 0.87 | 1.05 |
| | 75° | −0.13 | −0.01 | 0.25 | 0.29 |

Because color differences between measured values of paints of these corrected toned-paint plates and reference colors are small and results of color determination and micro-brilliant feeling determination through visual observation are acceptable. Therefore, repair painting is applied to an automobile by using corrected toning paints to visually perform equal color determination for repair painted portions of the automobile and paint-film surfaces nearby the portions and resultantly, preferable color matching is obtained.

The following Table 5 shows results of confirming micro-brilliant feeling data values of micro-brilliant-feeling sample-color tags and corrected-paint plates. Micro-brilliant-feeling data values of references colors and corrected toned-paint plates are measured by a micro-brilliant-feeling measuring instrument for laboratory use made by MINOLTA CO., LTD. to process electronic images by a computer.

TABLE 5

| Color | | MGR | MBV |
|---|---|---|---|
| Silver M1 | Reference color | 60.20 | 44.55 |
| | Micro-brilliant-feeling sample-color tag | 62.89 | 47.38 |
| | Corrected toned-paint Plate | 62.34 | 46.88 |
| Green MP | Reference color | 58.00 | 42.63 |
| | Micro-brilliant-feeling sample-color tag | 56.50 | 40.50 |
| | Corrected toned-paint Plate | 56.39 | 40.36 |
| Blue P | Reference color | 59.10 | 38.97 |
| | Micro-brilliant-feeling sample-color tag | 59.82 | 40.20 |
| | Corrected toned-paint Plate | 58.57 | 39.92 |

As clarified by values of micro-brilliant-feeling parameters MGR and MBV shown in the above Table 5, differences between values of MGR and MBV in reference colors, micro-brilliant-feeling sample-color tags, and corrected toned-paint plates are kept within ±3 for all paint colors (in general, a person recognizes the difference between values of micro-brilliant-feeling parameters MGR and MBV when the difference exceeds 3) and micro-brilliant feelings are also numerically matched.

A computer paint-toning method of the present invention allows an immature toning person to tone colors having brilliant feeling at a high accuracy.

What is claimed is:

1. A toning method of a paint having brilliant feeling characterized by executing the following steps (1) to (3) by a computer toning apparatus constituted by (A) a colorimeter, (B) micro-brilliant-feeling sample-color tags, and (C) a computer in which a plurality of paint blendings, color data and micro-brilliant-feeling data corresponding to the paint blendings, and color characteristic data and micro-brilliant-feeling data of a plurality of primary-color paints are entered and a color-matching-computation logic using said paint blendings and data values works:

(1) a step of measuring a reference color with which the color of a paint should be matched through toning by a colorimeter and obtaining color data of the reference color;

(2) a step of comparing said reference color with micro-brilliant-feeling sample-color tags and deciding the micro-brilliant feeling of said reference color; and (3) a step of comparing the color data and micro-brilliant feeling of said reference color with the color data and micro-brilliant-feeling data corresponding to paint blendings previously entered in a computer, indexing matching degrees between colors and micro-brilliant feelings of said entered paint blendings, and selecting a prospective paint blending.

2. The toning method according to claim 1, further characterized by executing (4) a step of correcting a selected prospective paint blending by a color-matching logic and obtaining a corrected blending closer to a reference color after said step (3).

3. The toning method according to claim 1, characterized by transferring said prospective paint blending obtained in step (3) or said corrected blending obtained in step (4) to an electronic balance.

4. A toning method of a paint having brilliant feeling characterized by executing the following steps (5) to (7) by a computer toning apparatus constituted by (A) a calorimeter, (B) micro-brilliant-feeling sample-color tags, and (C) a computer in which a plurality of color numbers, paint blendings corresponding to said color numbers, color data and micro-brilliant-feeling data corresponding to said paint blendings, and color characteristic data and micro-brilliant-feeling characteristic data of a plurality of primary-color paints are entered and a color-matching logic using said paint blendings and said data works:

(5) a step of measuring a reference color with which a paint color should be matched through toning by a colorimeter and obtaining the color data of said reference color;

(6) a step of comparing said reference color with micro-brilliant-feeling sample-color tags and deciding the micro-brilliant feeling said reference color; and (7) a step of selecting the color data and micro-brilliant-feeling data of at least one paint blending having a color number same as the preset color number of said reference color, comparing the color data and micro-brilliant-feeling data of said selected paint blending with the color data and micro-brilliant-feeling of said reference color, indexing the matching degree between the color and micro-brilliant feeling of said selected paint pant blending, and selecting a prospective paint blending.

5. The toning method according to claim 4, characterized by further executing (8) a step of correcting said selected prospective paint blending by a color-matching logic and obtaining a corrected blending closer to said reference color after said step (7).

6. The toning method according to claim 4, characterized by further transferring said prospective paint blending obtained in step (7) or said corrected blending obtained in step (8) to an electronic balance.

7. The toning method according to claim 2, characterized by further transferring said prospective paint blending obtained in step (3) or said corrected blending obtained in step (4) to an electronic balance.

8. The toning method according to claim 5, characterized by further transferring said prospective paint blending obtained in step (7) or said corrected blending obtained in step (8) to an electronic balance.

* * * * *